(12) United States Patent
Ohlig et al.

(10) Patent No.: US 12,497,012 B2
(45) Date of Patent: Dec. 16, 2025

(54) METHOD FOR OPERATING A VEHICLE BRAKE SYSTEM, AND A VEHICLE BRAKE SYSTEM

(71) Applicant: ZF Active Safety GmbH, Koblenz (DE)

(72) Inventors: Benedikt Ohlig, Vallendar (DE); Thomas Hein, Neuwied (DE)

(73) Assignee: ZF Active Safety GmbH, Koblenz (DE)

( * ) Notice: Subject to any disclaimer, the term of this patent is extended or adjusted under 35 U.S.C. 154(b) by 162 days.

(21) Appl. No.: 18/469,021

(22) Filed: Sep. 18, 2023

(65) Prior Publication Data
US 2024/0092328 A1    Mar. 21, 2024

(30) Foreign Application Priority Data

Sep. 19, 2022  (DE) .......................... 102022123977.2

(51) Int. Cl.
| | |
|---|---|
| *B60T 13/58* | (2006.01) |
| *B60T 8/171* | (2006.01) |
| *B60T 8/172* | (2006.01) |
| *B60T 13/68* | (2006.01) |
| *B60T 13/74* | (2006.01) |
| *B60T 17/22* | (2006.01) |
| *B60T 11/10* | (2006.01) |

(52) U.S. Cl.
CPC ............ *B60T 13/588* (2013.01); *B60T 8/171* (2013.01); *B60T 8/172* (2013.01); *B60T 13/686* (2013.01); *B60T 13/741* (2013.01); *B60T 17/22* (2013.01); *B60T 11/105* (2013.01)

(58) Field of Classification Search
CPC ........ B60T 8/171; B60T 8/172; B60T 11/105; B60T 13/588; B60T 13/686; B60T 13/741; B60T 17/22
See application file for complete search history.

(56) References Cited

U.S. PATENT DOCUMENTS 10,435,006 B2 * 10/2019 Baehrle-Miller ..... B60T 17/221

FOREIGN PATENT DOCUMENTS

| DE | 102004004992 A1 | 9/2005 | |
|---|---|---|---|
| DE | 102011016126 A1 * | 10/2012 | ............ B60T 13/741 |
| DE | 202015008975 U1 | 6/2016 | |
| DE | 102015211461 A1 | 12/2016 | |
| DE | 102020109450 A1 | 10/2021 | |
| DE | 102021127054 A1 | 12/2022 | |

* cited by examiner

*Primary Examiner* — Mark L. Greene
(74) *Attorney, Agent, or Firm* — Kristin L. Murphy (57) ABSTRACT

The present relates to a method for operating a vehicle brake system which comprises a vehicle brake having a brake piston, an electrohydraulic service brake device, and an electromotive parking brake device having a spindle drive driven by an electric motor, wherein the electrohydraulic service brake device and/or the electromotive parking brake device act on the brake piston. The method determines an additional brake fluid volume to be delivered by the electrohydraulic service brake device in order to ensure a target clamping force (Fz-Soll) for a brake pad of the parking brake on application of the parking brake device.

19 Claims, 3 Drawing Sheets

METHOD FOR OPERATING A VEHICLE BRAKE SYSTEM, AND A VEHICLE BRAKE SYSTEM

CROSS-REFERENCE TO RELATED APPLICATION

This application claims priority to German Priority Application No. 102022123977.2, filed Sep. 19, 2022, the disclosure of which is incorporated herein by reference in its entirety.

TECHNICAL FIELD

The present disclosure relates to a method for operating a vehicle brake system and to a vehicle brake system for a vehicle, wherein the vehicle brake system comprises at least one vehicle brake, an electrohydraulic service brake device and an electromotive parking brake device.

BACKGROUND

When a vehicle brake which can be actuated both by an electromotive parking brake device and by an electrohydraulic service brake device is applied, the damping force that is to be applied for parking braking is generally provided by both devices if the force demand exceeds the maximum clamping force which can be applied by the parking brake device alone. The parking brake device here already causes a translational movement of the brake piston of the vehicle brake, whereby the pressure conditions in the piston chamber of the vehicle brake that is provided for the brake fluid are influenced.

An electrohydraulic service brake device is here to be understood as being a brake component of the vehicle brake system which fulfils the normal brake functionality when the vehicle is being driven. In other words, the service brake device is the brake component that is actuated when the driver or a driver assistance system triggers a braking command, for example by a brake pedal, while the vehicle is being driven in the usual manner.

An electromotive parking brake device is here to be understood as being a further brake component which is typically actuated when a parking brake command is triggered, for example the so-called handbrake. This means that the parking brake device is generally intended to ensure that the vehicle is stopped securely even on an inclined road surface, in particular when the driver is absent.

However, the parking brake device may under some circumstances be insufficient to reliably implement a parking brake command for the vehicle. If, for example, the vehicle is parked on a hill, the service brake device must additionally be activated in order to exert an additional subcomponent of the damping force on the brake pad of the vehicle brake, so that there is a superposition with the subcomponent of the damping force effected by the parking brake device, which is able to ensure that the vehicle is stationary. It should be taken into account here that spindle drives of electromotive parking brake devices, in a self-locking state, are able to maintain higher clamping forces than they themselves can achieve. This means that, by simultaneously using the parking brake device and the service brake device, higher clamping forces can be achieved overall, and these clamping forces can subsequently be maintained by the parking brake device, namely by the spindle drive in a self-locking state, even though the ignition of the vehicle may be deactivated.

Maintenance of the pressure in the piston chamber of the brake piston by a brake fluid delivered by the service brake device is eliminated for the parked situation of the vehicle, in order to avoid a loss of clamping force in the event of a leak.

In addition, the required clamping force is generally also variable as a result of external influences. For example, it is dependent on the inclination of the vehicle, whereby there is generally in addition a downhill-slope force, with the result that a higher target clamping force is to be provided in order to reliably ensure a parked position of the vehicle. Consequently, the force component of the clamping force that is to be effected by the electrohydraulic service brake device is generally also variable.

This has the result that control of the volume flow of the brake fluid which forms the basis of the electrohydraulic service brake device is to be provided. As the overriding criterion, the volume flow of the brake fluid must be adjusted such that the required target clamping force, combined with a safety margin, taking account of the force component of the parking brake device, is exceeded.

In known approaches, the pressure in the piston chamber for the brake piston of the vehicle brake is detected by a pressure sensor, and then the additional volumetric quantity to be delivered and applied is determined in order to establish in the piston chamber a hydraulic pressure which, together with the parking brake device, exerts on the brake piston a clamping force above the target clamping force. However, suitable pressure sensors are expensive and have a slow response behaviour. Moreover, the control quality which can be achieved is limited.

SUMMARY

According to an aspect, a method for operating a vehicle brake system is provided. The vehicle brake system has a vehicle brake having a brake piston, an electrohydraulic service brake device, and an electromotive parking brake device having a spindle drive driven by an electric motor. The electrohydraulic service brake device and/or the electromotive parking brake device act on the brake piston. The method determines an additional brake fluid volume to be delivered by the electrohydraulic service brake device in order to ensure a target clamping force for a brake pad of the vehicle brake on application of the parking brake device. The method comprises at least the following steps:

A number of signal oscillations per unit time of a machine signal of the electric motor actuated for applying the parking brake device is detected by a counting mechanism (step A).

A piston position and/or a piston speed of the brake piston displaced by the electric motor is determined by a data processing unit at least on the basis of the number of signal oscillations detected in step A (step B).

A chamber volume of a piston chamber of the brake piston that is displaced by the brake piston is determined by the data processing unit at least on the basis of the piston position and/or the piston speed determined in step B (step C).

An additional volumetric quantity of a brake fluid to be delivered is determined at least on the basis of the displaced chamber volume determined in step C, the total volume of the piston chamber for the brake fluid and the target clamping force (step D).

According to the present method, the control quality for the determination of the additional volumetric quantity of brake fluid to be delivered in order to surpass the target clamping force can advantageously be increased compared to known approaches. This has the result that a safety margin when exceeding the target clamping force can be made smaller. In other words, the additional volumetric quantity of brake fluid to be delivered can advantageously be determined with such accuracy that smaller piston strokes are nevertheless sufficient to reliably surpass the target clamping force.

The evaluation of electrical signals, here of the machine signal of the electric motor, is possible more quickly and more reliably than can be achieved in the case of the detection of mechanical quantities, such as, for example, the pressure by a pressure sensor. The control time can thus be shortened and the precision of the control increased. The control quality of the method is thus improved compared to known approaches. The basis for this is the detection of the signal oscillations of a machine signal of the electric motor, which makes it possible to determine the speed and/or position for at least one component of the electric motor, for example a rotational speed or a rotational angle of the rotor. Because the electric motor is coupled in a torque-transmitting manner with the brake piston by way of the spindle drive, the position and/or speed thereof can be determined, from which the chamber volume displaced on translation of the brake piston can be calculated.

The clamping force can here be understood as being the force by which the brake pad is pressed against the brake disc rotor. Optionally, the clamping force in respect of the brake disc rotor can be distributed over a plurality of brake pads. The clamping force can be effected by the service brake device or the parking brake device or generally jointly by the service brake device and the parking brake device.

Because of the shorter piston strokes that are possible as a result of the higher control quality, the clamping force resulting from the translation of the brake piston exceeds the target clamping force by less than hitherto. A difference between the clamping force that is actually applied and the target clamping force is thus smaller than hitherto. As a result, the brake pad, which is subjected to the clamping force by the brake piston, is pressed against the brake disc rotor with a lower contact force. Nevertheless, the contact force is sufficiently high that the parking brake device can reliably be applied, that is to say self-locking of the parking brake device, more specifically of the spindle drive, can be brought about, so that the target clamping force is ensured in a lasting manner (until the self-locking is released). Overall, the clamping force tolerance, which leads to high component loads (costs, weight, wear), is reduced.

This also has the result that a residual friction torque, which occurs when the brake is released, is lower than hitherto. The residual friction torque describes the state that friction still occurs between the brake pad and the brake disc rotor, depending on the exact position of the brake pad, despite the brake pad being retracted as a result of the brake piston being guided back. The reason for this is elastic deformations of components of the vehicle brake. However, if the piston stroke is shortened in order to surpass the target clamping force, the residual friction torque occurs only within a shortened translational travel path of the brake pad (and thus also of the brake piston). As a result, the residual friction torque overall is reduced, both in terms of its amplitude and in terms of the travel path of the brake piston along which it occurs.

Overall, it thus becomes possible to use less expensive actuators for the parking brake device.

In addition, the higher control quality ensures that incorrect control can be avoided, which would occur if the initially determined additional brake fluid quantity to be delivered was too small as a result of low control quality, so that additional tightening of the brake piston would be necessary in order to exceed the target clamping force.

By the present method, expensive, temperamental and slow pressure sensors, which are used in accordance with other approaches for detecting a pressure in the piston chamber of the brake piston, can be avoided.

The data processing unit can here comprise in particular an integrated circuit. The data processing unit can in particular be part of a processor or of a controller.

The displaced chamber volume is here to be understood as being the partial volume of the piston chamber of the brake piston that is circulated by a translation of the brake piston.

The total volume of the piston chamber of the brake piston is here not limited to the piston chamber. The total volume of the piston chamber can also comprise corresponding volumes of feed lines of the piston chamber.

Optionally, the signal oscillations are detected in step A by an asynchronous counter. Asynchronous counters can reliably identify extremes, for example maxima, minima, changeover times or threshold value conditions, in a signal that generally varies over time, here the machine signal of the electric motor.

The machine signal can in particular be a switch signal of the electric motor for at least one component, for example a coil.

The machine signal can be provided, for example, by a current controller associated with the electric motor. It thus becomes possible to determine the position of a component of the electric motor, for example the rotor, by way of the machine signal.

Because the electric motor is coupled in a torque-transmitting manner with the brake piston, the piston speed and/or piston position of the brake piston can thus generally be determined.

In particular, the electric motor can comprise an electric machine, for example can be a direct current machine, in particular a brushless direct current machine.

In an example, the signal oscillations detected by the asynchronous counter are used to determine a rotor angular position of the electric motor and/or to determine a machine characteristic. The rotor angular position so determined and/or the machine characteristic so determined is taken into account in step B for determining the piston position and/or piston speed of the brake piston.

Generally, although all electric motors are supplied with a nominal machine characteristic, this is usually variable during operation in dependence on the operating conditions (e.g. the temperature). By using the detected signal oscillations and by determining the machine characteristic, or determining the rotor angular position, the system as a whole is adapted to the particular time-dependent conditions. The control quality for the determination of the additional volumetric quantity of brake fluid to be delivered is thus improved.

Optionally, a machine model is taken into account in step B. The machine model generally describes the electric motor independently of the applied voltage and the applied current, specifically hi terms of the coupling of the electrical activation and the output that provides the torque. However, the particular operating conditions (e.g. the temperature) can affect the machine model. By way of the rotor angular position or the machine characteristic, which can be determined at a particular point in time by the detected signal oscillations, the machine model can be determined precisely for that point in time, independently of operating conditions that generally vary over time. If the machine model is then taken into account in the determination of the piston speed or the piston position, the control quality for the determination of the additional volumetric quantity of brake fluid to be delivered is improved further.

Particularly, a transmission ratio of the spindle drive and a stiffness of a casing of the vehicle brake are taken into account in step B. The stiffness can indicate, for example, to what extent individual components of the vehicle brake are elastically deformable when the clamping force is exerted on the brake pad. A safety margin that is to be taken into account in respect of the target clamping force can thus be implemented. The transmission ratio of the spindle drive can be used to determine the exact position of the brake piston in dependence on a component position of the electric motor, for example of the rotor, which is known by way of the detected signal oscillations.

According to an exemplary arrangement, the data processing unit is associated with the electrohydraulic service brake device. The electromotive parking brake device is then coupled with the data processing unit by a communication device. The data processing unit receives from the parking brake device at least the number of signal oscillations detected in step A. This allows the parking brake device and the service brake device to be produced and implemented generally independently of one another. The data communication between the parking brake device and the data processing unit of the service brake device ensures that the detected signal oscillations are made available to the data processing unit. The data processing unit can then carry out at least steps B to D as explained above. This makes it possible, for example, for the parking brake device and the service brake device to be acquired from different manufacturers. In this connection, the communication device can also comprise a software interface.

Generally, at least steps B to of the present method are computer-implemented. Optionally, step A can also be computer-implemented, for example if the machine signal comprises an activation signal for the electric motor provided by a current controller. In this case, different data processing units can be provided, for example separately from the parking brake device and the service brake device, in order to carry out on the one hand step A and on the other hand steps B to D.

In an example, the machine signal of the electric motor is obtained by combining a current signal and a voltage signal of the electric motor. Combining the current signal and the voltage signal is particularly advantageous if the electric motor is provided by an electric machine which can generally be operated in different operating modes, for example a motor mode and a generator mode. In this case, it is possible to switch between the current signal and the voltage signal, in particular in dependence on the particular operating mode. Because the machine is operated at a specific voltage or in a specific voltage range, the voltage signal is in this case constant. The voltage signal of the machine therefore does not exhibit any clearly analysable signal oscillations in motor mode. In this case, the current signal can be used for detecting the signal oscillations. By contrast, if the machine is used in generator mode, the voltage signal exhibits clearly analysable signal oscillations owing to the induced voltage. Thus, it is advantageously possible to switch between the current signal and the voltage signal for detecting the signal oscillations.

Optionally, the current signal and the voltage signal can also be combined by a mathematical operation, for example an addition, subtraction, multiplication or division. Generally, a plurality of these mathematical operations can also be used for combining the current signal and the voltage signal.

Particularly, the current signal and the voltage signal are added together. The added combined signal then exhibits analysable signal oscillations both in the motor mode and in the generator mode of the machine.

Optionally, a standardization of the combined signals can be taken into account. A standard simpler circuit can thus be used in order to be able to detect the signal oscillations in a time-independent manner, since the circuit does not have to take account of any amplitude variations. The standardization can additionally also be carried out for combining the current signal and the voltage signal. Standardization can be ensured, for example, by multiplying a combined signal by a standardization factor.

In an exemplary arrangement, the machine signal is conditioned. Conditioning of the machine signal can be understood as being in particular the application of a filter mechanism, for example a bandpass filter. It is thus ensured that only frequency components of a specific frequency range are allowed to pass in respect of conditioning, while other frequency components are at least strongly attenuated. Interfering components in the machine signal to be analysed can thus be filtered. Furthermore, the demands on the circuit that carries out the analysis of the signal oscillations are reduced.

In an example, conditioning of the machine signal is carried out in dependence on an estimated rotational angle signal. The rotational angle signal can be a rotational frequency or rotational speed of the electric motor. The rotational speed of the electric motor, or of the electric machine, is generally variable. In order to compensate for this variability, conditioning can be carried out in dependence on the estimated rotational angle signal. This results in the machine signal being filtered as required, whereby the signal quality is improved. For example, the mid-band frequency of a bandpass filter can be adapted in dependence on the rotational angle signal (adaptive bandpass filtering).

Optionally, the estimated rotational angle signal is determined by modelling the current signal and the voltage signal. To that end, a mathematical model of the electric motor can be used. A rotational angle signal can thus be estimated in dependence on the current signal and the voltage signal as well as on known parameters, such as the motor constant KM of the electric motor and the total resistance RG. For example, an instantaneous angular speed $\omega$ can be determined for an instantaneous signal value I of the current signal and an instantaneous signal value U of the voltage signal in accordance with the formula $\omega=(U-RG*I)/KM$. The instantaneous angular speed $\omega$ of the electric motor can then be converted in known manner into the instantaneous rotational frequency of the direct current machine, which is used as the estimated rotational angle signal.

The total resistance RG is given by the line and connection resistances and the internal resistance of the electric motor.

In an exemplary arrangement, the service brake device further has at least one control valve which is fluidically coupled with a piston chamber, associated with the brake piston, for the brake fluid and with a brake fluid reservoir. The method is then used for applying or releasing the parking brake device and comprises at least the step:

Admitting the brake fluid to the piston chamber by controlling and/or regulating the control valve at least on the basis of the additional volumetric quantity of brake fluid to be delivered by the electrohydraulic service brake device (step E) determined in step D.

The control valve is associated with the electrohydraulic service brake device. The control valve can be used to introduce brake fluid into or discharge it from the piston chamber. The control valve is in particular coupled at least indirectly with the data processing unit. It is also conceivable that a controller is provided for the control valve, so that control of the control valve takes place on the basis of data which the controller has received from the data processing unit.

Ultimately, the control valve allows the position of the brake piston to be adjusted such that the volume of the piston chamber that is then displaced corresponds to the additional volumetric quantity of brake fluid to be delivered. The piston stroke can thus be shortened, whereby wear of the vehicle brake is reduced.

Optionally, after the additional volumetric quantity of brake fluid to be delivered has been supplied and the target clamping force has been exceeded, while the electric motor is at the same time being driven, a hydraulic pressure in the piston chamber is reduced again, so that self-locking of the spindle drive occurs. The electric motor is switched to inactive during or after the reduction of the hydraulic pressure, so that no further clamping force is generated. Although the service brake device may be necessary in order to be able to apply sufficient clamping force so that the target clamping force can be surpassed, the spindle drive can be adapted to be able to maintain such high clamping forces in the self-locking state, even though the electric motor underlying the spindle drive is subsequently switched to inactive.

Self-locking here describes the state of mechanical blocking between the spindle and the spindle nut of the parking brake device. Because the spindle nut maintains its position in the self-locking state, and because the spindle nut is mechanically coupled with the brake piston, the brake piston also maintains its piston position as soon as self-locking of the spindle drive is achieved. This is independent of whether the brake fluid is discharged from the piston chamber. The stationary position of the vehicle can thus be ensured by the closed brake even though the vehicle brake is de-energized in respect of the electric motor.

In an example, the brake fluid introduced into the piston chamber is relieved of pressure in the direction towards the brake fluid reservoir, or discharged into the brake fluid reservoir, and the electric motor is de-energized after self-locking of the spindle drive has been achieved.

This means not only that the electric motor of the parking brake device can be de-energized as soon as self-locking of the spindle drive has been achieved, but also that the brake fluid in the piston chamber can be relieved of pressure, or discharged from the piston chamber. The vehicle brake is thus both de-energized and relieved of pressure in respect of the piston chamber and can nevertheless ensure a parked configuration of the vehicle by the closed brake. The risk of a loss of brake fluid due to a leak of the piston chamber is thus reduced.

In another exemplary arrangement, the parking brake device can first be deactivated (de-energization of the electric motor) before the brake fluid in the piston chamber is relieved of pressure.

Optionally, for releasing the parking brake device which is in the self-locking state, brake fluid is introduced into the piston chamber and a hydraulic pressure is established in the piston chamber such that the clamping force exerted by the service brake device and the parking brake device is increased above a clamping force corresponding to the applied parking brake device, until self-locking of the spindle drive is released. The electric motor is then activated in the release direction of the parking brake device. The applied parking brake device here relates to the spindle drive in the self-locking state. In order to release the self-locking, it is generally necessary to apply a clamping force that is greater than the clamping force that corresponds to the self-locked spindle drive. To that end, the service brake device is here advantageously used in addition to the parking brake device. As a result, it is possible for the actuator of the parking brake device to be made smaller. This leads to a weight and cost saving.

According to a further aspect there is also provided a vehicle brake system which comprises a vehicle brake having a brake piston, an electrohydraulic brake device and an electromotive parking brake device having a spindle drive driven by an electric motor. The electrohydraulic service brake device and/or the electromotive parking brake device act on the brake piston. The vehicle brake system comprises a counting mechanism and at least one data processing unit by which the vehicle brake system is adapted to carry out the method as described above.

According to a further aspect there is also provided a program code with commands which, when carried out by the data processing unit, cause the vehicle brake system described above to carry out the method which has likewise been described.

According to a further aspect there is also provided a vehicle having an electromechanical brake as described above.

Optionally, the vehicle can comprise in particular a motor vehicle, that is to say a road vehicle. In another exemplary arrangement, the vehicle can also comprise other types of vehicle, for example aircraft, ships, two-wheeled vehicles, motorcycles or the like. Overall, a vehicle is here understood as being a device that is configured for the transport of objects, cargo or people between different destinations. Examples of vehicles are land-based vehicles such as motor vehicles, electric vehicles, hybrid vehicles or the like, rail vehicles, aircraft or water craft. In an example, vehicles can be considered in the present context as being road-based vehicles, such as, for example, cars, lorries, buses or the like.

All the features which have been explained in relation to the different aspects can be combined individually or in (sub-)combination with other aspects.

BRIEF DESCRIPTION OF DRAWINGS

The disclosure as well as further exemplary arrangements and developments thereof will be described and explained in greater detail hereinbelow by the examples shown in the drawings, in which.

DETAILED DESCRIPTION

The following detailed description in conjunction with the accompanying drawings, in which the same numerals refer to the same elements, is intended as a description of different exemplary arrangements of the disclosed subject matter and is not to represent the individual exemplary arrangements. Each exemplary arrangement described in this disclosure serves merely as an example or illustration and is not to be interpreted as being preferred or advantageous over other exemplary arrangements.

All the features disclosed herein below in relation to the exemplary arrangements and/or the accompanying figures can be combined on their own or in any desired subcombination with features of the aspects of the present disclosure, including features of other exemplary arrangements, provided that the resulting feature combination is meaningful for a skilled person in the technical field.

Figure 1:
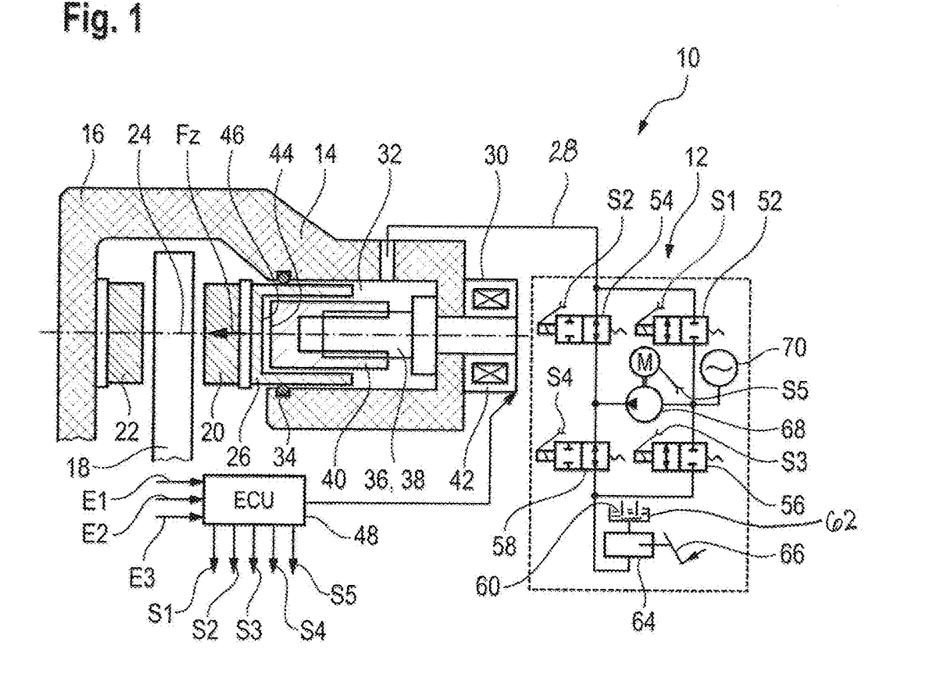
FIG. 1 shows a simplified schematic cross-sectional view of a vehicle brake system according to the disclosure.

FIG. 1 shows a simplified schematic cross-sectional view of a vehicle brake system 10 according to the disclosure.

The vehicle brake system 10 comprises a vehicle brake 14 having a brake calliper 16 as part of its casing.

The brake calliper 16 is axially displaceable with respect to the axis 24. The brake calliper 16 encloses a brake disc rotor 18, which is surrounded in the axial direction by two brake pads 20, 22. The inner brake pad 20 is actively subjected to a clamping force Fz by a brake piston 26.

The axially displaceable brake calliper 16 ensures that the outer brake pad 22 is likewise subjected to the clamping force Fz. The clamping force Fz is here distributed substantially equally in terms of amount between the inner brake pad 20 and the outer brake pad 22. Thus, for both brake pads 20, 22, as a result of the contact force that is provided, frictional engagement with the brake disc rotor 18 can be ensured, which is used for decelerating or securing a vehicle.

The vehicle brake system 10 here has an electrohydraulic service brake device 12 (shown in parts) and an electromotive parking brake device 30.

The vehicle brake 14 comprises a piston chamber 32 into which brake fluid 60 can be introduced by the service brake device 12 by way of a brake line 28. This leads to a pressure variation within the piston chamber 32, which can effect a translation of the brake piston 26 in the axial direction. The brake piston 26 is here secured against rotation relative to the casing of the vehicle brake 14.

The piston chamber 32 is sealed with respect to other parts of the vehicle brake 14 by at least one seal 34. The service brake device 12 is thus adapted, in dependence on the quantity of brake fluid introduced thereby into the piston chamber 32, or in dependence on the brake pressure generated thereby in the piston chamber 32, to effect a clamping force Fz on the brake pads 20, 22 by way of the brake piston 26.

The electromotive parking brake device 30 comprises a spindle drive 36 having a spindle 38, which is rotatable about the axis 24, and a corresponding spindle nut 40. The spindle 38 bears against the casing of the vehicle brake 14. Rotation of the spindle 38 is effected by an electric motor 42 of the parking brake device 30. The rotation of the spindle 38 then leads to a translational displacement of the spindle nut 40, which is mounted so as to be secured against rotation, along the axis 24.

Because the spindle nut 40 acts by way of an actuating element 44 on a base 46 of the brake piston 26, a translation of the brake piston 26 can thus likewise be effected. As a result, the parking brake device 30 can also exert a clamping force Fz in respect of the brake disc rotor 18.

The spindle drive 36 is here self-locking. This means that the spindle nut 40 can be mechanically fixed relative to the spindle 38. Self-locking is ensured by the spindle drive 36.

The parking brake device 30 has an actuator which can effect a maximum clamping force Fz-Fest-Max. The self-locking of the spindle drive 36 is, however, capable of maintaining even such clamping forces that are greater than the maximum clamping force Fz-Fest-Max achievable by the parking brake device 30 alone. This means that, with the aid of the service brake device 12, it is possible to establish a clamping force Fz effected by the brake piston 26 that is greater than the maximum clamping force Fz-Fest-Max achievable by the parking brake device 30 alone, and that this clamping force can be maintained when the spindle drive 36 is fixed by self-locking. As a result, the possibility is provided of designing the actuator of the parking brake device 30 to be smaller, whereby a weight and cost saving becomes possible.

The axis 24 here corresponds (disregarding lateral forces) also to the cylinder axis of the casing of the vehicle brake 14 and to the rotational axis of the spindle 38, and also to the reference axis along which the spindle nut 40 and the brake piston 26 are displaced in translation.

A data processing unit 48 is coupled, or electrically connected, with the electric motor 42 of the parking brake device 30. The data processing unit 48 is configured and programmed to detect signal oscillations of a machine signal of the electric motor 42 per unit time.

The data processing unit 48 is here coupled, or electrically connected, both with the service brake device 12 and with the parking brake device 30. In another exemplary arrangement, the data processing unit 48 can also be associated in particular with the service brake device 12. The parking brake device 30 can then also have its own data processing unit. In this case, the parking brake device 30 can be coupled, or electrically connected, with a communication device in order to transmit at least the number of detected signal oscillations to the data processing unit 48 of the service brake device 12. Because communication is provided between the parking brake device 30 and the data processing unit 48 of the service brake device 12, these components of the vehicle brake system 10 can then in principle also be acquired from different suppliers and combined in a common vehicle brake system 10. The modularity of the vehicle brake system 10 is thus improved.

The service brake device 12 has control valves 52, 54, 56, 58 by which a volume flow of the brake fluid 60 can be controlled. The service brake device 12 further comprises at least one brake fluid reservoir 62, from which the brake fluid 60, corresponding to an adjusted pressure, can be admitted to the piston chamber 32 of the vehicle brake 14 by a brake pressure generator unit 64 by way of the brake line 28. In the normal operating mode of the service brake device 12, the brake pressure generator unit 64 adapts the pressure to a driver input effected by way of a pedal 66.

The data processing unit 48 receives input signals E1, E2, E3, which can describe, for example, external vehicle parameters, in order to determine therefrom the target clamping force Fz-Soll, for example.

Such external vehicle parameters can be, for example, the following: a driver input, effected by way of a parking brake switch, for actuation of the parking brake device; the vehicle speed, in order to detect when the vehicle is stationary; the loading state of the vehicle and/or the inclination of the road surface on which the vehicle is to be kept stationary, in order to adapt the target clamping force Fz-Soli.

The control valves 52, 54, 56, 58 are used to adapt the pressure exerted by the brake fluid 60 in the piston chamber 32 of the vehicle brake as required according to their switch positions. To that end, the data processing unit 48 outputs the control signals S1 to S4 to the control valves 52, 54, 56, 58. In order additionally to be able to influence the pressure modulation, the service brake device 12 has a pump 68 in order to be able to deliver brake fluid 60 discharged into a low-pressure accumulator 70 back into the piston chamber 32 of the vehicle brake 14 by way of the brake line 28 for pressure build-up. The data processing unit 48 outputs a corresponding control signal S5 to a drive motor of the pump 68 in order to control the delivery of the brake fluid 60 as required.

The parking brake device 30 is generally to ensure a parking brake situation of the vehicle by the vehicle brake 14. For the parking brake situation, a target clamping force Fz-Soll is to be applied in a lasting manner, in dependence on external vehicle parameters, in order to ensure the position of the vehicle.

The parking brake device 30 is adapted to be able to effect a maximum clamping force Fz-Fest-Max in respect of the brake piston 26. However, for particular external conditions, for example the positioning of the vehicle on a hill, target clamping forces Fz-Soll may be required that are greater than the maximum clamping force Fz-Fest-Max that can be effected by the parking brake device 30. The service brake device 12 can therefore be used to apply an additional clamping force Fz-Betrieb at least temporarily.

Because the service brake device 12 is required in any case for conventional operation of the vehicle brake 14, the joint use of the service brake device 12 and of the parking brake device 30 can provide the possibility of using a smaller actuator for the parking brake device 30, so that a cost and weight saving is possible.

The actuator of the parking brake device 30 is, however, at least so selected that the sum of the maximum clamping force Fz-Betrieb-Max that can be applied by the service brake device 12 and the maximum clamping force Fz-Fest-Max that can be effected by the parking brake device 30 is greater than the maximum target clamping force Fz-Soll-Max for reliably ensuring the position of the vehicle, independently of the external conditions, that is to say: Fz-Betrieb-Max+Fz-Fest-Max>Fz-Soll-Max.

Figure 2:
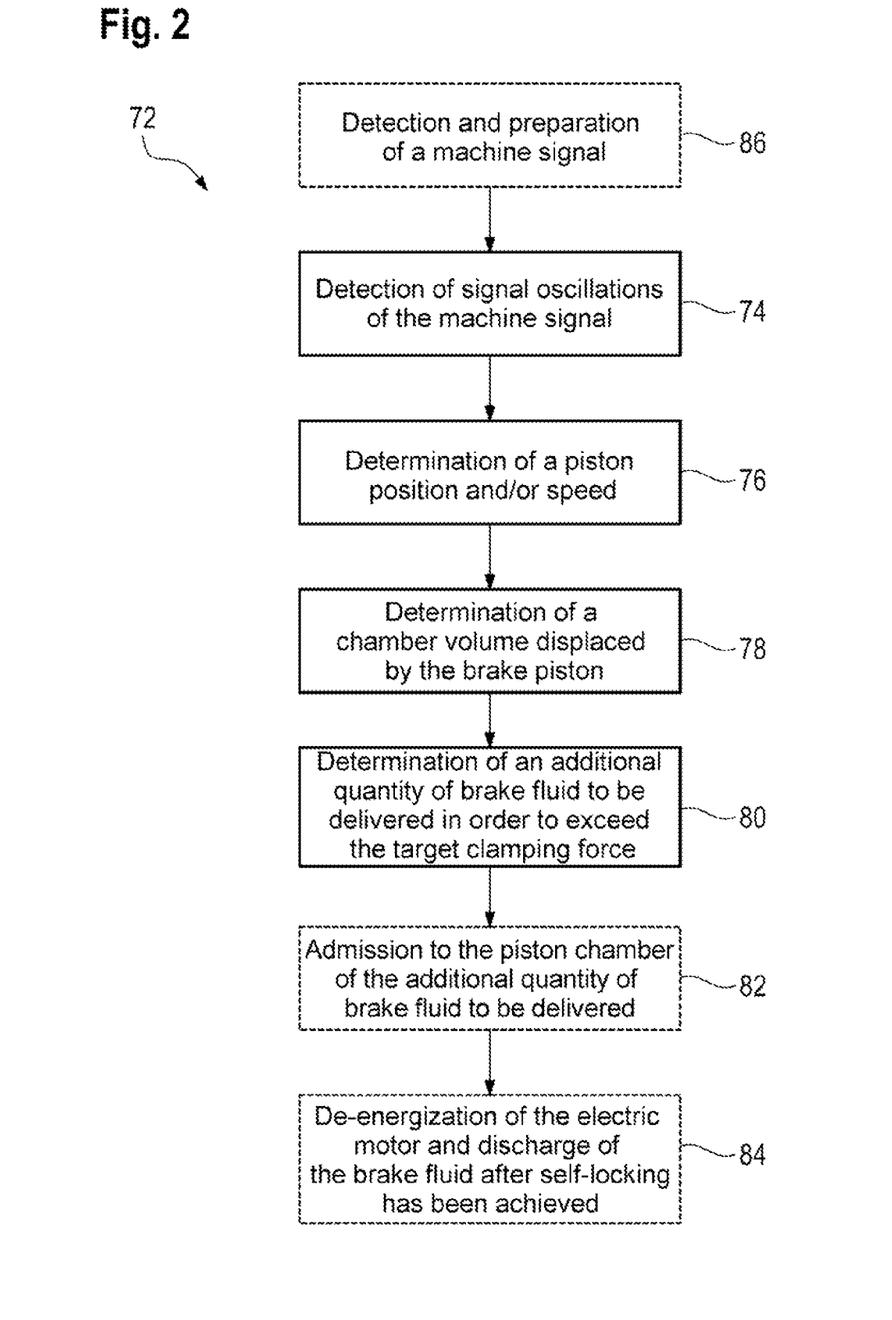
FIG. 2 shows a simplified schematic representation of a method according to the disclosure for operating a vehicle brake system.

FIG. 2 shows a simplified schematic representation of a method 72 for operating a vehicle brake system 10 according to the disclosure. Optional method steps are shown by broken lines.

In step 74, a number of signal oscillations per unit time of a machine signal of the electric motor 42 actuated for applying the parking brake device 30 is detected by a counting mechanism.

To that end, the counting mechanism can have in particular an asynchronous counter which is adapted to detect specific signal events of the machine signal, for example minima, maxima, switching times or threshold value conditions. The time unit can be dependent on the operating frequency of the electric motor 42. Because the electric motor 42 acts on the brake piston 26 in a torque-transmitting manner by the spindle drive 36, conclusions in respect of the brake piston 26 can thus be made at least indirectly.

In step 76, a piston position and/or piston speed of the brake piston 26 displaced by the electric motor 42 is determined by a data processing unit at least on the basis of the number of signal oscillations detected in step 74. The data processing unit used for this purpose can be a data processing unit of the parking brake device 30. Optionally, the number of detected signal oscillations can also be transmitted to the service brake device 12 and the determination of the piston position and/or of the piston speed can be carried out by the data processing unit 48 of the service brake device 12.

For determining the piston position and/or the piston speed, a machine model of the spindle drive 36 can be taken into account. For example, the transmission ratio of the spindle drive 36 and the stiffness of the casing of the vehicle brake 14 can be taken into account, whereby the determination of the piston position and/or of the piston speed is improved.

Optionally, at least a rotor angular position and/or a machine characteristic of the electric motor 42 can also be determined by the detected signal oscillations. These parameters can then likewise be taken into account in the determination of the piston position and/or of the piston speed of the brake piston 26.

Knowledge of the piston position and/or of the piston speed of the brake piston 26 allows a chamber volume of the piston chamber 32 of the brake piston 26 that is displaced by the brake piston 26 to be determined in step 78 by the data processing unit 48 at least on the basis of the piston position and/or the piston speed determined in step 76. As a result of the known piston position and/or the piston speed, the movement of the brake piston 26 within the piston chamber 32 can be understood. The chamber volume displaced by the brake piston 26 can thus be determined. Consequently, it is known what proportion of the chamber volume is without brake fluid 60 as a result of a movement of the brake piston 26 (the brake piston 26 is extended in order to be able to apply a clamping force Fz).

As a result, an additional volumetric quantity of brake fluid 60 to be delivered can be determined in step 80 at least on the basis of the displaced chamber volume determined in step 78, a total volume of the piston chamber 32 for the brake fluid 60 and the target clamping force Fz-Soll. The additional volumetric quantity of brake fluid 60 to be delivered here refers to the admission of the brake fluid 60 in order to be able to apply a clamping force Fz that is greater than the target clamping force Fz-Soll.

In other words, knowledge of the chamber volume displaced by the brake piston 26, with knowledge of the piston position, makes it possible to determine the clamping force that is currently being applied by the brake piston 26. Because the target clamping force Fz-Soll is determined by external vehicle parameters, for example the position of the vehicle, it is known in this respect what additional component of the damping force Fz must be applied in order to exceed the target clamping force Fz-Soll. Because the applied clamping force Fz is directly dependent on the piston position of the brake piston 26, the additional travel path by which the brake piston 26 must be displaced in order to achieve the required clamping force Fz can thus be determined. The travel path that is additionally to be covered by the brake piston 26 is directly dependent on the additional volumetric quantity of brake fluid 60 to be delivered, which in this respect serves as a control variable for achieving the intended clamping force Fz.

When exceeding the target clamping force Fz-Soll, a safety margin Delta-Fz can be taken into account for the determination of the additional volumetric quantity of brake fluid 60 to be delivered.

As a result of the direct coupling between the electric motor 42, the spindle drive 36 and the brake piston 26, detection of the signal oscillations of the machine signal of the electric motor 42 makes it possible to increase the control quality in the determination of the additional volumetric quantity of brake fluid 60 to be delivered. The reason for this is that the evaluation of electrical signals, here of the machine signal of the electric motor 42, is possible more quickly and more reliably than can be achieved in the case of the detection of mechanical quantities, such as, for example, the pressure by a pressure sensor. The control time can thus be shortened and the precision of the control increased. The control quality of the method 72 is thus improved compared to known approaches.

It is thus also possible to provide a smaller safety margin Delta-Fz than hitherto. Consequently, the piston stroke for achieving the desired clamping force Fz is shortened, whereby the bad on the brake disc rotor 18 and the brake pads 20, 22 is reduced.

Optionally, the method 72 comprises the step 82 of admitting the brake fluid 60 to the piston chamber 32 by controlling and/or regulating at least one of the control valves, namely the control valve 54, which here is in the form of a check valve, at least on the basis of the additional volumetric quantity of brake fluid 60 to be delivered by the electrohydraulic service brake device 12 determined in step 80. Control of the control valve 54 is here ensured by the data processing unit 48 of the service brake device 12.

Ultimately, the control valve 54 makes it possible to adjust the position of the brake piston 26 such that the volume of the piston chamber 32 that is then displaced corresponds to the additional volumetric quantity of brake fluid 60 to be delivered. Because the travel path of the brake piston 26 is shortened, it is thus possible to reduce the residual friction torque which occurs as a result of friction that still occurs between the brake disc rotor 18 and the brake pads 20, 22 over a certain proportion of the travel path of the brake piston 26 when the vehicle brake 14 is released. The wear on the vehicle brake 14 is thus reduced.

Provision of the brake fluid 60 can optionally be ensured by a plurality of control valves 52, 54, 56, 58 of the service brake device 12.

After the additional volumetric quantity of brake fluid 60 to be delivered has been supplied and the target clamping force Fz-Soll has been exceeded, while the electric motor 42 is at the same time being driven, a hydraulic pressure in the piston chamber 32 is reduced again and/or the electric motor 42 of the parking brake device 30 is de-energized in the optional step 84, so that sell-locking of the spindle drive 36 occurs. The electric motor 42 is switched to inactive during or after the reduction of the hydraulic pressure so that no further clamping force Fz is generated. Because the spindle drive 36 in the self-locking state is able to maintain higher clamping forces Fz than the parking brake device 30 itself can generate, the contact force between the brake pads 20, 22 and the brake disc rotor 18 can be maintained even though the electric motor 42 is de-energized as soon as the spindle drive 36 is in the self-locking state. The current consumption and the wear of the electric motor 42 are thus reduced.

Optionally, the brake fluid 60 can also be discharged from the piston chamber 32 in step 84 as soon as the spindle drive 36 is in the self-locking state. The risk of a leak and of a loss of brake fluid is thus reduced.

Figure 3:
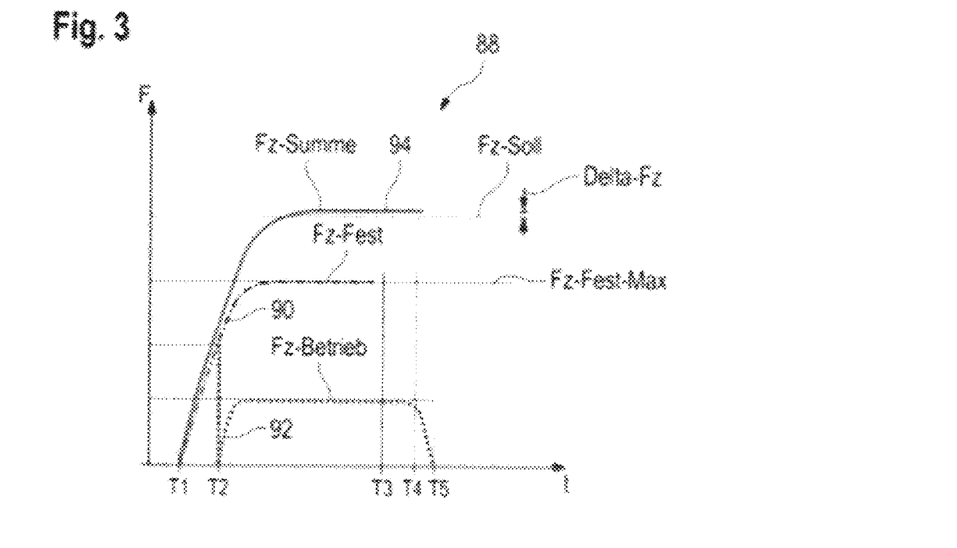
FIG. 3 shows a simplified schematic force-time diagram on closing of a vehicle brake of a vehicle brake system according to the disclosure.

FIG. 3 shows a simplified force-time diagram 88 on closing of a vehicle brake 14 operated according to the disclosure.

It can be seen that, owing to the external conditions, for example the vehicle being located on a hill, the demand for the target clamping force Fz-Soll is above the maximum clamping force Fz-Fest-Max that can be applied by the parking brake device 30. The service brake device 12 can be used to exert the damping force Fz-Betrieb in addition to the parking brake device 30 (time T2). By superposing the two force components, the summed clamping force Fz-Summe is obtained, which provides the possibility, by the service brake device 12, of exceeding the demand for the target clamping force Fz-Soll. To that end, the additional volumetric quantity of brake fluid 60 to be delivered is determined in accordance with the method 72 and introduced into the piston chamber 32 (step 82). After the target clamping force Fz-Soll has been exceeded, the self-locking of the spindle drive 36 can ensure that the damping force Fz-Summe that has been achieved is maintained even though the electric motor 42 is de-energized (time T3). Then, or optionally at the same time, the brake fluid 60 is discharged from the piston chamber 32 (time T4). The vehicle brake 14 is thus transferred into a parking brake configuration (time T5) in which the damping force Fz-Summe is ensured solely by the spindle drive 36 which is in the self-locking state.

Figure 4:
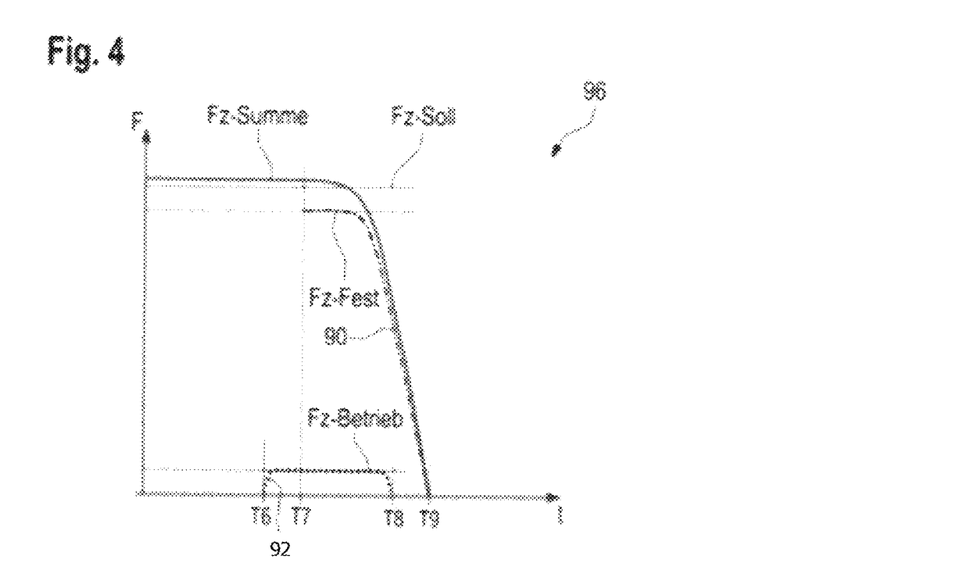
FIG. 4 shows a simplified schematic force-time diagram on release of a vehicle brake of a vehicle brake system according to the disclosure.

FIG. 4 shows a simplified schematic force-time diagram 96 on release of a vehicle brake 14 operated according to the disclosure.

In order to be able to release the self-locking of the spindle drive 36 and in order not to end the parking brake configuration of the vehicle brake 14 abruptly, the use of the service brake device 12 in addition to the parking brake device 30 is also possible when releasing the vehicle brake 14 operated according to the disclosure. This is dependent on whether a target clamping force Fz-Soll that can be effected by the parking brake device 30 alone is required for releasing the spindle drive 36 which is in the self-locking state.

Optionally, the service brake device 12 can be used at time T6 in order to apply an additional component of the clamping force Fz-Betrieb. Together with the component Fz-Fest effected by the parking brake device 30, the summed clamping force Fz-Summe, by which the target clamping force Fz-Soll can be exceeded, is obtained. The self-locking of the spindle drive 36 can thus be released (time T7). The electric motor 42 is then operated in the release direction so that the force component Fz-Fest effected by the parking brake device 30 is reduced. At time T8, the brake fluid can be discharged from the piston chamber 32, whereby the service brake device 12 is deactivated. At time T9, the parking brake device 30 is withdrawn completely, so that no further clamping force Fz is exerted on the brake piston 26.

The method 72 can further comprise the detection and preparation of a machine signal of the electric motor 42 in the optional step 86.

In particular, both a voltage signal and a current signal of the electric motor 42 can here be detected. The voltage signal and the current signal can also be combined with one another, for example added together. The combined machine signal then exhibits analysable signal oscillations independently of the operating mode of the electric motor 42. In this connection, the electric motor 42 is to be regarded as an electric machine which can be operated both in motor mode and in generator mode. It is relevant that a voltage signal in generator mode generally does not exhibit readily analysable signal oscillations. This disadvantage can be eliminated by combining the current signal and the voltage signal.

The combined machine signal can also be standardized.

In addition, the combined machine signal can be conditioned, for example by bandpass filtering. The analysis of the signal oscillations can thus advantageously be simplified, because unwanted frequency ranges of the machine signal are attenuated in their amplitude.

Optionally, the bandpass filtering can be adaptive. This means that a rotational frequency or a rotational speed of at least one component of the electric motor 42 is determined, whereby a rotational angle signal of the electric motor 42 is provided. The bandpass filtering can then be adapted in dependence on the rotational angle signal, for example the mid-band frequency of the bandpass filtering can be adapted as required.

In order to obtain the rotational angle signal, the current signal and the voltage signal of the electric motor 42 can be modulated on the basis of a motor model. The angular frequency of the electric motor 42 can be determined in dependence on the motor constant, the total resistance, the current signal and the voltage signal.

Overall, there is thus provided in step 86 a machine signal, the signal oscillations of which can advantageously be analysed more reliably in the following step 74. For example, the demands on the circuit which carries out the detection are lower. The control quality for the determination of the additional volumetric quantity of brake fluid 60 to be delivered is thus improved further.

The invention claimed is:

1. A method for operating a vehicle brake system which comprises a vehicle brake having a brake piston, an electrohydraulic service brake device, and an electromotive parking brake device having a spindle drive driven by an electric motor, wherein the electrohydraulic service brake device and/or the electromotive parking brake device act on the brake piston, wherein the method determines an additional brake fluid volume to be delivered by the electrohydraulic service brake device in order to ensure a target clamping force (Fz-Soll) for a brake pad of the parking brake device on application of the parking brake device, and comprises:
   A) detecting, by a counting mechanism, a number of signal oscillations per unit time of a machine signal of the electric motor actuated for applying the parking brake device,
   B) determining, by a data processing unit, a piston position and/or piston speed of the brake piston displaced by the electric motor at least on the basis of the number of signal oscillations detected in step A,
   C) determining, by the data processing unit, a chamber volume of a piston chamber of the brake piston that is displaced by the brake piston at least on the basis of the piston position and/or the piston speed determined in step B,
   D) determining an additional volumetric quantity of a brake fluid to be delivered at least on the basis of the displaced chamber volume determined in step C, a total volume of the piston chamber for the brake fluid and the target clamping force (Fz-Soll), and
   E) controlling a control valve fluidically coupled with the piston chamber and a brake fluid reservoir to admit brake fluid to the piston chamber based on the additional volumetric quantity determined in step D, thereby applying the parking brake device and achieving a clamping force corresponding to the target clamping force.

2. The method according to claim 1, wherein the signal oscillations are detected in step A by an asynchronous counter.

3. The method according to claim 2, wherein the signal oscillations detected by the asynchronous counter are used to determine a rotor angular position of the electric motor and/or to determine a machine characteristic, wherein the rotor angular position so determined and/or the machine characteristic so determined is taken into account in step B for determining the piston position and/or piston speed of the brake piston.

4. The method according to claim 1, wherein a machine model is taken into account in step B.

5. The method according to claim 4, wherein a transmission ratio of the spindle drive and a stiffness of a casing of the vehicle brake are taken into account in step B.

6. The method according to claim 1, characterized in that wherein the data processing unit is associated with the electrohydraulic service brake device, wherein the electromotive parking brake device is coupled with the data processing unit by a communication device, and wherein the data processing unit receives from the parking brake device at least the number of signal oscillations detected in step A.

7. The method according to claim 1, wherein the machine signal is obtained by combining a current signal and a voltage signal of the electric motor.

8. The method according to claim 7, wherein the machine signal is conditioned.

9. The method according to claim 8, wherein conditioning of the machine signal is carried out in dependence on an estimated rotational angle signal.

10. The method according to claim 9, wherein the estimated rotational angle signal is determined by modelling the current signal and the voltage signal.

11. A vehicle brake system which comprises a vehicle brake having a brake piston, an electrohydraulic service brake device, and an electromotive parking brake device having a spindle drive driven by an electric motor, wherein the electrohydraulic service brake device and/or the electromotive parking brake device act on the brake piston, wherein the vehicle brake system comprises a counting mechanism and at least one data processing unit by which the vehicle brake system is adapted to carry out the method according to claim 1.

12. A vehicle brake system comprising: a vehicle brake having a brake piston, an electrohydraulic service brake device, an electromotive parking brake device having a spindle drive driven by an electric motor, a counting mechanism, and at least one data processing unit, wherein the electrohydraulic service brake device and/or the electromotive parking brake device act on the brake piston, wherein the vehicle brake system is configured to:
   A) detect, by the counting mechanism, a number of signal oscillations per unit time of a machine signal of the electric motor actuated for applying the parking brake device,
   B) determine, by the data processing unit, a piston position and/or piston speed of the brake piston displaced by the electric motor at least on the basis of the number of signal oscillations detected in step A,
   C) determine, by the data processing unit, a chamber volume of a piston chamber of the brake piston that is displaced by the brake piston at least on the basis of the piston position and/or the piston speed determined in step B,
   D) determine an additional volumetric quantity of a brake fluid to be delivered at least on the basis of the displaced chamber volume determined in step C, a total volume of the piston chamber for the brake fluid and a target clamping force (Fz-Soll), and
   E) control a control valve fluidically coupled with the piston chamber and a brake fluid reservoir to admit brake fluid to the piston chamber based on the additional volumetric quantity determined in step D, thereby applying the parking brake device and achieving a clamping force corresponding to the target clamping force Fz-Soll).

13. The vehicle brake system according to claim 12, wherein the signal oscillations are detected in step A by an asynchronous counter.

14. The vehicle brake system according to claim 13, wherein the signal oscillations detected by the asynchronous counter are used to determine a rotor angular position of the electric motor and/or to determine a machine characteristic, wherein the rotor angular position so determined and/or the machine characteristic so determined is taken into account in step B for determining the piston position and/or piston speed of the brake piston.

15. The vehicle brake system according to claim 12, wherein a machine model is taken into account in step B.

16. A method for operating a vehicle brake system which comprises a vehicle brake having a brake piston, an electrohydraulic service brake device, and an electromotive parking brake device having a spindle drive driven by an electric motor, wherein the electrohydraulic service brake device and/or the electromotive parking brake device act on the brake piston, wherein the service brake device further has at least one control valve which is fluidically coupled with a piston chamber associated with the brake piston, for brake fluid and with a brake fluid reservoir, wherein the method determines an additional brake fluid volume to be delivered by the electrohydraulic service brake device in order to ensure a target clamping force (Fz-Soll) for a brake pad of the parking brake device on application of the parking brake device, as well as applying or releasing the parking brake device, and comprises:
- A) detecting, by a counting mechanism, a number of signal oscillations per unit time of a machine signal of the electric motor actuated for applying the parking brake device,
- B) determining, by a data processing unit, a piston position and/or piston speed of the brake piston displaced by the electric motor at least on the basis of the number of signal oscillations detected in step A,
- C) determining, by the data processing unit, a chamber volume of a piston chamber of the brake piston that is displaced by the brake piston at least on the basis of the piston position and/or the piston speed determined in step B,
- D) determining an additional volumetric quantity of brake fluid to be delivered at least on the basis of the displaced chamber volume determined in step C, a total volume of the piston chamber for the brake fluid and the target clamping force (Fz-Soll), and
- E) admitting the brake fluid to the piston chamber by controlling and/or regulating the control valve at least on the basis of the additional volumetric quantity of brake fluid to be delivered by means of the electrohydraulic service brake device determined in step D.

17. The method according to claim 16, wherein, after the additional volumetric quantity of brake fluid to be delivered has been supplied and the target clamping force (Fz-Soll) has been exceeded, while the electric motor is at the same time being driven, a hydraulic pressure in the piston chamber is reduced and self-locking of the spindle drive occurs, wherein the electric motor is switched to inactive after the reduction of the hydraulic pressure so that no further clamping force (Fz) is generated.

18. The method according to claim 17, wherein the brake fluid introduced into the piston chamber is relieved of pressure in the direction towards the brake fluid reservoir, and the electric motor is de-energized after self-locking of the spindle drive has been achieved.

19. The method according to claim 17, wherein, for releasing the parking brake device which is in the self-locking state, brake fluid is introduced into the piston chamber and a hydraulic pressure is established in the piston chamber such that the clamping force (Fz-Summe) exerted by the service brake device and the parking brake device is increased above a clamping force corresponding to the applied parking brake device, until self-locking of the spindle drive is released, and activating the electric motor in the release direction of the parking brake device.

* * * * *